United States Patent
Vasquez et al.

(10) Patent No.: US 8,823,721 B2
(45) Date of Patent: Sep. 2, 2014

(54) TECHNIQUES FOR ALIGNING FRAME DATA

(75) Inventors: Maximino Vasquez, Fremont, CA (US); Ravi Ranganathan, Sunnyvale, CA (US); Seh W. Kwa, Saratoga, CA (US); Todd M. Witter, Orangevale, CA (US); Kyungtae Han, Portland, OR (US); Paul S. Diefenbaugh, Portland, OR (US)

(73) Assignee: Intel Corporation, Santa Clara ( * ) Notice: Subject to any disclaimer, the term of this patent is extended or adjusted under 35 U.S.C. 154(b) by 1067 days.

(21) Appl. No.: 12/655,410

(22) Filed: Dec. 30, 2009

(65) Prior Publication Data

US 2011/0157198 A1 Jun. 30, 2011

(51) Int. Cl.
*G09G 5/39* (2006.01)
*G06F 13/372* (2006.01)
*G09G 3/36* (2006.01)
*H04N 5/06* (2006.01)
*H03L 7/00* (2006.01)
*H04N 9/74* (2006.01)

(52) U.S. Cl.
USPC ............... 345/534; 345/98; 345/99; 345/531; 348/521; 348/547; 348/584

(58) Field of Classification Search
USPC .................. 345/87–104, 530–537, 545–551; 348/521–524, 513, 529, 547, 548, 348/584–601, 500
See application file for complete search history.

(56) References Cited

U.S. PATENT DOCUMENTS

| | | | |
|---|---|---|---|
| 5,027,212 A * | 6/1991 | Marlton et al. | 348/512 |
| 5,909,225 A | 6/1999 | Schinnerer et al. | |
| 5,919,263 A | 7/1999 | Kikinis et al. | |
| 5,963,200 A | 10/1999 | Deering et al. | |
| 6,166,748 A | 12/2000 | Van Hook et al. | |
| 6,657,634 B1 | 12/2003 | Sinclair et al. | |
| 6,909,434 B2 * | 6/2005 | Takala et al. | 345/537 |
| 6,966,009 B1 | 11/2005 | Boduch | |
| 6,967,659 B1 | 11/2005 | Jayavant et al. | |
| 7,017,053 B2 | 3/2006 | Mizuyabu et al. | |
| 7,268,755 B2 | 9/2007 | Selwan | |
| 7,397,478 B2 | 7/2008 | Jiang | |

(Continued)

FOREIGN PATENT DOCUMENTS

CN 1728765 A 2/2006
CN 1816844 A 8/2006

(Continued)

OTHER PUBLICATIONS

Office Action received in Korean Patent Application No. 2010-0133848, mailed Jul. 3, 2012, 1 page of English translation only.

(Continued)

*Primary Examiner* — Wesner Sajous
*Assistant Examiner* — Andrew Shin
(74) *Attorney, Agent, or Firm* — Glen B Choi (57) ABSTRACT

Techniques are described that can used to synchronize the start of frames from multiple sources so that when a display is to output a frame to a next source, boundaries of current and next source are aligned. Techniques are useful to avoid visual distortions when changing from a first video source to a second video source.

23 Claims, 8 Drawing Sheets

(56) References Cited

U.S. PATENT DOCUMENTS

| | | | |
|---|---|---|---|
| 7,535,478 B2 | 5/2009 | Dunton et al. | |
| 7,558,264 B1 | 7/2009 | Lolayekar et al. | |
| 7,839,860 B2 | 11/2010 | Kobayashi | |
| 7,864,695 B2 | 1/2011 | Morinaga et al. | |
| 2003/0227460 A1 | 12/2003 | Schinnerer | |
| 2004/0189570 A1 | 9/2004 | Selwan | |
| 2004/0233226 A1* | 11/2004 | Toriumi et al. | 345/690 |
| 2005/0162414 A1 | 7/2005 | Kubota | |
| 2007/0091359 A1 | 4/2007 | Suzuki et al. | |
| 2007/0150616 A1 | 6/2007 | Baek et al. | |
| 2007/0152993 A1 | 7/2007 | Mesmer et al. | |
| 2007/0242011 A1* | 10/2007 | Kita | 345/87 |
| 2007/0291037 A1 | 12/2007 | Blaukopf et al. | |
| 2008/0008172 A1 | 1/2008 | Kobayashi | |
| 2008/0036748 A1 | 2/2008 | Lees | |
| 2008/0055318 A1 | 3/2008 | Glen | |
| 2008/0143695 A1 | 6/2008 | Juenemann et al. | |
| 2008/0168285 A1 | 7/2008 | De Cesare et al. | |
| 2008/0180432 A1 | 7/2008 | Lee | |
| 2009/0079746 A1 | 3/2009 | Howard et al. | |
| 2009/0125940 A1 | 5/2009 | Kim et al. | |
| 2009/0158377 A1 | 6/2009 | Diab et al. | |
| 2009/0162029 A1 | 6/2009 | Glen | |
| 2010/0087932 A1 | 4/2010 | Mccoy et al. | |
| 2010/0319037 A1* | 12/2010 | Kim et al. | 725/81 |

FOREIGN PATENT DOCUMENTS

| | | |
|---|---|---|
| CN | 101454823 A | 6/2009 |
| CN | 101491090 A | 7/2009 |
| JP | 2001-016221 A | 1/2001 |
| JP | 2001-016222 A | 1/2001 |
| JP | 2005-027120 A | 1/2005 |
| JP | 2006-268738 A | 10/2006 |
| JP | 2008-084366 A | 4/2008 |
| JP | 2008-109269 A | 5/2008 |
| JP | 2008-182524 A | 8/2008 |
| KR | 2008-0039532 A | 5/2008 |
| KR | 2008-0091843 A | 10/2008 |
| TW | 243523 A | 3/1995 |
| TW | 200746782 A | 12/2007 |

OTHER PUBLICATIONS

Office Action received in Chinese Patent Application No. 201010622967.5, mailed Jan. 31, 2013, 5 page Chinese Office Action and 7 pages of English Translation.

Office Action received in Chinese Patent Application No. 200910222296.0, mailed Jun. 20, 2012, 11 pages of Office Action including 6 pages of English translation.

Office Action Received for Korean Patent Application No. 10-2009-111387 mailed on Jan. 30, 2012, 3 pages of Office Action and 7 pages of English Translation.

Office Action received for Chinese Patent Application No. 200910222296.0, mailed on Sep. 28, 2011, 25 pages of Office action including 8 pages of English Translation.

Office Action received for Korean Patent Application No. 10-2009-111387, mailed on Mar. 9, 2011, 8 pages of English Translation and 5 pages of Office Action.

Office Action received for Korean Patent Application No. 10-2009-92283, mailed on Feb. 12, 2011, 3 pages of English Translation and 3 pages of Office Action.

"VESA Embedded DisplayPort Standard", Video Electronics Standards Association (VESA), Version 1.3, Jan. 13, 2011, pp. 1-81.

Section 2.2.5.4 Extension Packet, VESA DisplayPort Standard, Video Electronics Standards Association, Version 1, Revision 1a, Jan. 11, 2008, pp. 1 and 81-83.

Panel Standardization Working Group, "Industry Standard Panels for Monitors-15.0-inch", Mounting and Top Level Interface Requirements, Panel Standardization Working Group, version 1.1, Mar. 12, 2003, pp. 1-19.

Office Action received in Chinese Patent Application No. 201010622960.3' mailed Jan. 6, 2013, 5 pages of Chinese Office Action and 8 pages of English translation.

Office Action received in Korean Patent Application No. 2010-0134783, mailed Jun. 17, 2012, 2 pages of English translation Action only.

Office Action received for U.S. Appl. No. 12/655,389, mailed on Jun. 22, 2012, 14 pages.

Office Action received for U.S. Appl. No. 12/655,389, mailed on Jan. 4, 2013, 14 pages.

Office Action received for U.S. Appl. No. 12/313,257, mailed on Sep. 29, 2011, 9 pages.

Office Action received for U.S. Appl. No. 12/313,257, mailed on Mar. 14, 2012, 9 pages.

Office Action received for U.S. Appl. No. 12/286,192, mailed on Apr. 29, 2010, 7 pages.

Office Action received for U.S. Appl. No. 13/625,185, mailed on Feb. 21, 2013, 11 pages.

Office Action received for U.S. Appl. No. 13/089,731, mailed on Jul. 22, 2011, 6 pages.

Office Action received for U.S. Appl. No. 13/349,276, mailed on Jul. 2, 2012, 6 pages.

Office Action received for Chinese Patent Application No. 200910221453.6, mailed on Oct. 10, 2011, 8 pages of Chinese Office Action including 4 pages of English Translation.

"VESA DisplayPort Standard", Video Electronics Standards Association (VESA), Version 1.1 a, Jan. 11, 2008, 4 pages.

Office Action received for Korean Patent Application No. 10-2009-0092283, mailed on Oct. 27, 2011, 2 pages of English Translation and 3 pages of Office Action.

Office Action received for Japanese Patent Application No. 10-2009-222990, mailed on Aug. 2, 2011, 4 pages of Japanese Office Actio including 2 pages of English Translation.

"VESA Embedded DisplayPort (eDP)", VESA eDP Standard, VESA eDP Standard, Video Electronics Standards Association, Version 1, Dec. 22, 2008, pp. 1-23.

"VESA Embedded DisplayPort (eDP) Standard", VESA eDP Standard, Video Electronics Standards Association, Version 1.1, Oct. 23, 2009, pp. 1-32.

"VESA Embedded DisplayPort Standard", eDP Standard, Video Electronics Standards Association, Version 1.2, May 5, 2010, pp. 1-53.

Office Action received in Taiwan Patent Application No. 98132686, mailed Dec. 26, 2012, 19 pages, and 5 pages of English translation.

Office Action received in Korean Patent Application No. 10-2009-92283, mailed Oct. 31, 2012, 5 pages of Office Action, including 2 pages of English translation.

Office Action received in Chinese Patent Application No. 200910221453.6, mailed Jul. 23, 2012, 5 pages of Office Action, including 2 pages of English Translation.

Office Action Received in Korean Patent Application No. 10-2009-92283, mailed Apr. 9, 2012, 8 pages, including 4 pages of English translation.

Office Action Received in Japanese Patent Application No. 2012-031772, mailed on May 14, 2013, 2 pages of English Translation and 2 pages of Office Action.

Search Report Received in Taiwanese Patent Application No. 098138973, mailed Feb. 25, 2013, 12 pages of Taiwanese Office Action including 3 page of English translation and 1 page of English Translation of Search Report.

Office Action received in Chinese Patent Application No. 200910222296.0, mailed Oct. 30, 2012, 7 pages of Office Action, including 4 pages of English translation.

Search Report Received in Taiwanese Patent Application No. 099143485, mailed Jun. 7, 2013, 16 pages of Taiwanese Office Action including 6 page of English Translation.

Office Action received in Chinese Patent Application No. 201010622967.5, mailed Jul. 10, 2013, 8 pages of Office Action including 5 pages English translation.

Office Action received in Chinese Patent Application No. 201010622960.3, mailed Jul. 12, 2013, 8 pages, including 5 pages of English translation.

(56) References Cited

OTHER PUBLICATIONS

Office Action Received in Taiwan Patent Application No. 98132686, mailed on Nov. 5, 2013, 1 page of English Translation and 5 pages of Office Action.

Office Action Received in Korean Patent Application No. 10-2013-7004123, mailed on Feb. 6, 2014, 4 pages of English Translation and 4 pages of Office Action.

* cited by examiner

TECHNIQUES FOR ALIGNING FRAME DATA

RELATED APPLICATIONS

This application is related to U.S. patent applications having Ser. No. 12/286,192, entitled "PROTOCOL EXTENSIONS IN A DISPLAY PORT COMPATIBLE INTERFACE," filed Sep. 29, 2008, inventors Kwa, Vasquez, and Kardach; Ser. No. 12/313,257, entitled "TECHNIQUES TO CONTROL SELF REFRESH DISPLAY FUNCTIONALITY," filed Nov. 18, 2008, inventors Kwa, Calyer, Ranganathan, and Biswal; and Ser. No. 12/655,389, entitled "TECHNIQUES FOR ALIGNING FRAME DATA," filed Dec. 30, 2009, inventors Kwa et al.

FIELD

The subject matter disclosed herein relates generally to display of images and more particularly to aligning data received from a graphics engine.

RELATED ART

Display devices such as liquid crystal displays (LCD) display images using a grid of row and columns of pixels. The display device receives electrical signals and displays pixel attributes at a location on the grid. Synchronizing the timing of the display device with the timing of the graphics engine that supplies signals for display is an important issue. Timing signals are generated to coordinate the timing of display of pixels on the grid with the timing of signals received from a graphics engine. For example, a vertical synch pulse (VSYNC) is used to synchronize the end of one screen refresh and the start of the next screen refresh. A horizontal synch pulse (HSYNC) is used to reset a column pointer to an edge of a display.

In some cases, a display switches from displaying images from a memory buffer to displaying video from the graphics engine. The memory buffer can be used in cases where the display is to render one or more frames from the frame buffer instead of from an external source such as a graphics engine. It is desirable to avoid unwanted image defects such as artifacts or partial screen renderings when changing from displaying images from a memory buffer to displaying video from the graphics engine.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Various techniques are described for re-synchronization of frame buffer data stream to display interface data stream when switching from frame buffer to the display interface, while using a single frame buffer (i.e., a frame buffer that holds only one frame of data). Various embodiments can be used when the panel is put in self refresh mode and now needs to switch to host generated timing so that the display image transitions from a static image to continuous image streaming from the host. A self refresh mode can be a mode when the display is to render one or more frames from the frame buffer instead of from an external source such as a graphics engine. However, various embodiments can be used in any display that contains a frame buffer and the image streaming from the host is not present at times. For example, if a display device is to receive video or image signals either by wired or wireless routes and the signal transmission is interrupted, video or an image from a frame buffer can be displayed instead of the transmitted video or images.

Various embodiments provide frame alignment techniques to attempt to achieve transitioning from a first source of frames to a second source of frames after alignment of frames from the first and second sources of frames. For example, a first frame source can be a memory buffer and a second frame source can be a stream of frames from a video source such as a graphics engine or video camera. Each frame of data represents a screen worth of pixels. After the first source provides a frame worth of data, various embodiments determine a time when the second source is to provide a frame worth of data and change the video source to the second source at the determined time.

Figure 1:
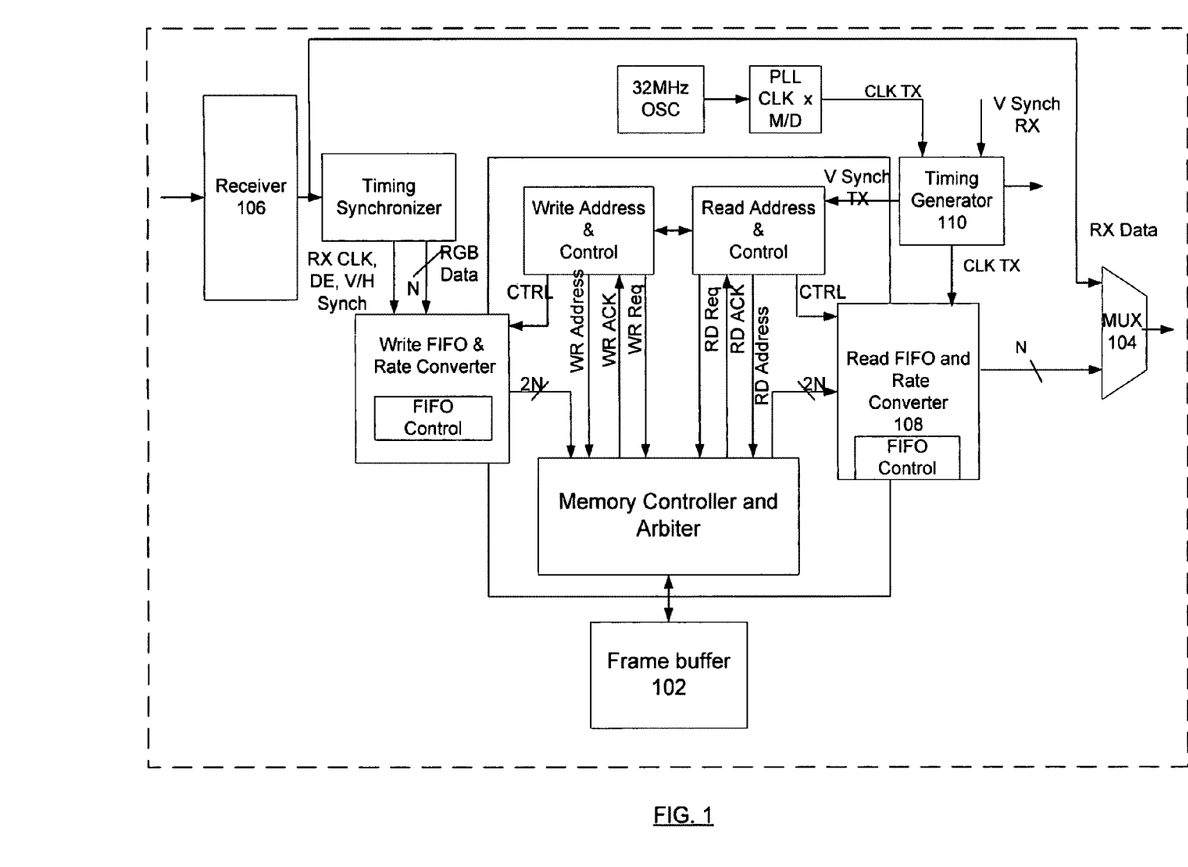
FIG. 1 is a block diagram of a system with a display that can switch between outputting frames from a display interface and a frame buffer.

FIG. 1 is a block diagram of a system with a display that can switch between outputting frames from a display interface and a frame buffer. Frame buffer 102 can be a single port RAM but can be implemented as other types of memory. The frame buffer permits simultaneous reads and writes from the frame buffer. The reads and writes do not have to be simultaneous. A frame can be written while a frame is read. This can be time multiplexed, for instance.

Multiplexer (MUX) 104 provides an image from frame buffer 102 or a host device received through receiver 106 to a display (not depicted). Receiver 106 can be compatible with Video Electronics Standards Association (VESA) DisplayPort Standard, Version 1, Revision 1a (2008) and revisions thereof. Read FIFO and Rate Converter 108 provides image or video from frame buffer 102 to MUX 104. RX Data identifies data from a display interface (e.g., routed from a host graphics engine, chipset, or Platform Controller Hub (PCH) (not depicted)). Timing generator 110 controls whether MUX 104 outputs image or video from RX Data or from frame buffer 102.

When the system is in a low power state, the display interface is disabled and the display image is refreshed from the data in the frame buffer 102. When the images received from the display interface start changing or other conditions are met, the system enters a higher power state. In turn, the display interface is re-enabled and the display image is refreshed based on data from the display interface or other conditions exist where the display image is refreshed based on data from the display interface. MUX 104 selects between frame buffer 102 or the display interface to refresh the display. In order to allow this transition into and out of the low power state to occur at any time, it is desirable that the switch between frame buffer 102 and graphics engine driving the display via the display interface occur without any observable artifacts on the display. In order to reduce artifacts, it is desirable for frames from frame buffer 102 to be aligned with frames from the display interface.

Table 1 summarizes characteristics of various embodiments that can be used to change from a first frame source to a second frame source.

TABLE 1

| Option | Max Lock Time | Min Lock Time | Missed Frames | Comments |
| --- | --- | --- | --- | --- |
| TCON Timing Lags | $V_T/N$ | 0 | 1 unless lock right away | |
| TCON Timing Leads | $V_T/N$ | 0 | 0 | Max N for lead is normally much less than for lag |
| Adaptive TCON Sync | $<V_T/N$ and $>=V_T/2N$ | 0 | 1 unless lock right away | Max Lock Time = $V_T/2N$ if N is the same for lag & lead. Otherwise Max Lock Time is greater |
| Continuous Capture | $V_T/N$ | 0 | 0 | Added power and 1 frame delay during bypass |
| TCON Reset | 0 | 0 | 0 | Lower part of display will have longer refresh than $V_T$ for one frame |
| Source Beacon | 0 | 0 | 0 | Extra power burned for beacon. |

$V_T$ indicates the source frame length in terms of line counts and N indicates a difference between vertical blanking regions of frames from the display interface and frames from the frame buffer in terms of line counts. $V_T$ can be expressed in terms of time.

In each case, the output from the MUX is switched approximately at alignment of the vertical blanking region of the frame from the frame buffer and a vertical blanking region of a frame from the graphics engine. Signal TCON_VDE represents vertical enabling of a display from the frame buffer of the display. When signal TCON_VDE is in an active state, data is available to display. But when signal TCON_VDE is in an inactive state, a vertical blanking region is occurring. Signal SOURCE_VDE represents vertical enabling of a display from a display interface. When signal SOURCE_VDE is in an active state, data from the display interface is available to display. When signal SOURCE_VDE is in an inactive state, a vertical blanking region is occurring for the frames from the display interface.

Signal SRD_ON going to an inactive state represents that the display is to be driven with data from the display interface beginning with the start of the next vertical active region on the display interface and frames from a graphics engine may be stored into a buffer and read out from the buffer for display until alignment has occurred. After alignment has occurred, frames are provided by the display interface directly for display instead of from the frame buffer.

When the MUX outputs frames from the display interface, the frame buffer can be powered down. For example, powering down frame buffer 102 can involve clock gating or power gating components of frame buffer 102 and other components such as the timing synchronizer, memory controller and arbiter, timing generator 110, write address and control, read address and control, write FIFO and rate converter, and read FIFO and rate converter 108.

Signal SRD_STATUS (not depicted) causes the output from the MUX to switch. When signal SRD_STATUS is in an active state, data is output from the frame buffer but when signal SRD_STATUS is in an inactive state, data from the display interface is output. Signal SRD_STATUS going to the inactive state indicates that alignment has occurred and the MUX can transfer the output video stream from the display interface instead of from the frame buffer.

TCON_VDE and SOURCE_VDE (not depicted) in an active state represent that a portion of a frame is available to be read from a frame buffer and display interface, respectively. Falling edges of TCON_VDE and SOURCE_VDE represent commencement of vertical blanking intervals for frames from a frame buffer and display interface, respectively. In various embodiments, signal SRD_STATUS transitions to an inactive state when the falling edge of SOURCE_VDE is within a time window, which is based on the TCON frame timing. An alternative embodiment would transition signal SRD_STATUS to an inactive state when a timing point based on the TCON frame timing falls within a window based on the SOURCE_VDE timing. The frame starting with the immediately next rising edge of signal SOURCE_VDE is output from the MUX for display.

For example, the window can become active after some delay from the falling edge of TCON_VDE that achieves the minimum vertical blank specification of the display not being violated for a TCON frame. The window can become inactive after some delay from becoming active that achieves the maximum vertical blank specification of the display not being violated for a TCON frame, while maintaining display quality, such as avoiding flicker. Depending on the embodiment, there may be other factors that establish a duration of the window, such as achieving a desired phase difference between TCON_VDE and SOURCE_VDE.

Figure 2:
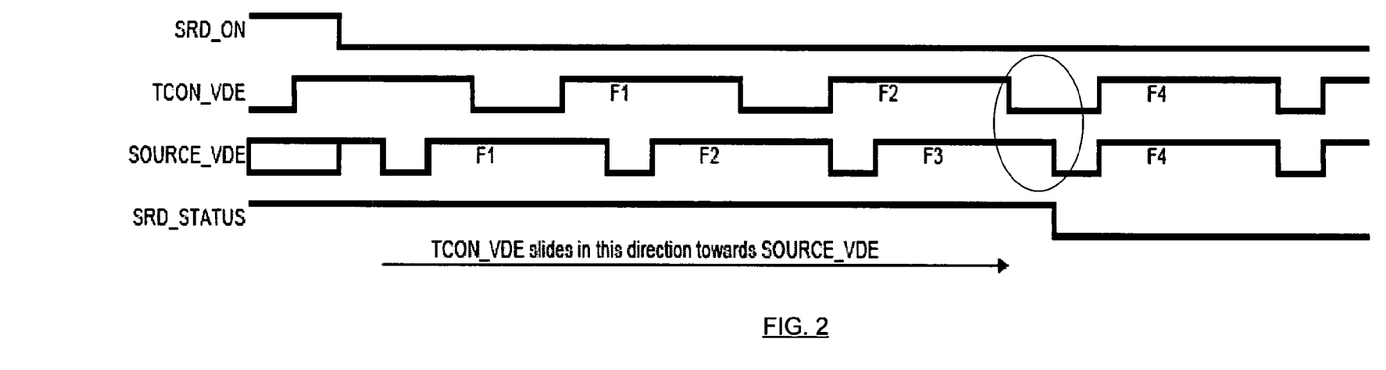
FIG. 2 depicts alignment of frames from a source with frames from a frame buffer where the frames from the frame buffer have a longer vertical blanking region than the frames from the display interface.

FIG. 2 depicts alignment of frames from a source with frames from a frame buffer where the frames from the frame buffer have a longer vertical blanking region than the frames from the display interface. In the table above, this scenario is labeled "TCON lags." When signal SRD_ON goes to the inactive state, the frame buffer is reading out a frame. The next frames from the display interface, F1 and F2, are written into the frame buffer and also read out from the frame buffer for display. Because the vertical blanking interval for the frame provided from the source (e.g., display interface) is less than the vertical blanking interval of frames from the frame buffer, the frames from the frame buffer gain N lines relative to each frame from the source each frame period.

In the circled region, the beginning of the blanking regions of the source frame and the frame buffer frame are within a window of each other. That event triggers the signal SRD_STATUS to transition to inactive state. At the next rising edge of signal SOURCE_VDE, the MUX outputs frame F4 from the graphics engine.

The aforementioned window can start at a delay from the falling edge of TCON_VDE so that the minimum vertical blank specification of the display is not violated for the TCON frame. The window can become inactive after some delay from becoming active that achieves (1) a maximum vertical blank specification of the display not being violated for the TCON frame while maintaining display quality and (2) reading of a frame from the frame buffer has not started yet.

One consequence of alignment is that a frame F3 from the frame buffer is skipped and not displayed even though it is stored in the frame buffer.

For the example of FIG. 2, the maximum time to achieve lock can be $V_T/N$, where $V_T$ is the source frame size and N is the difference in number of lines (or in terms of time) between vertical blanking regions of a frame from the graphics engine and a frame from the frame buffer. The minimum lock time can be 0 frames if the first SOURCE_VDE happens to align with TCON_VDE when SRD_ON becomes inactive.

Figure 3:
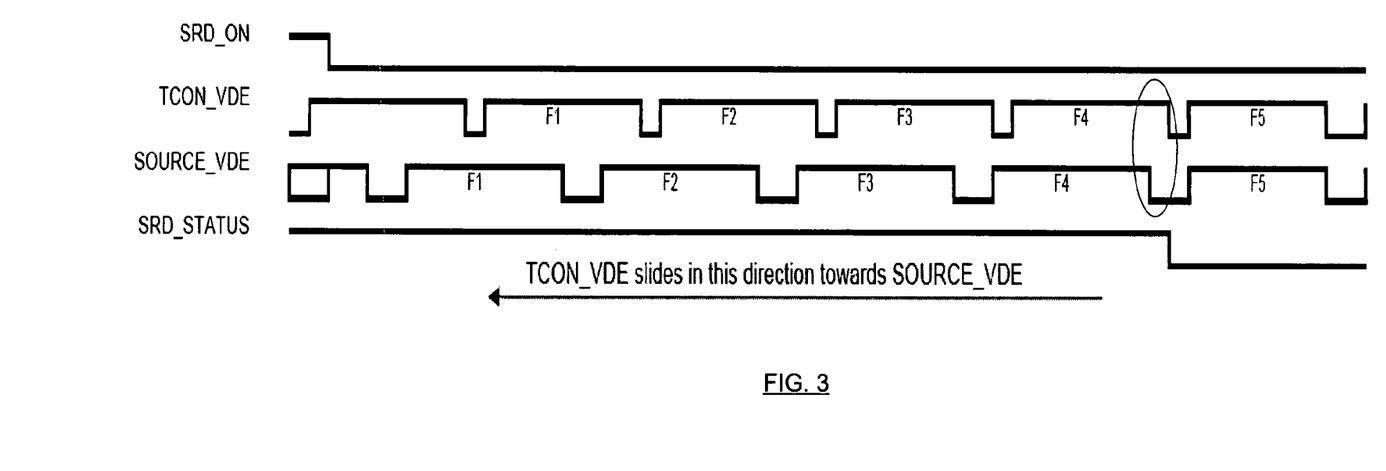
FIG. 3 depicts alignment of frames from a source with frames from a frame buffer where the frames from the frame buffer have a shorter vertical blanking region than the frames from the source.

FIG. 3 depicts alignment of frames from a source with frames from a frame buffer where the frames from the frame buffer have a shorter vertical blanking region than the frames from the source. In the table above, this scenario is labeled "TCON leads." Because the vertical blanking interval for the frame provided from the frame buffer is less than the vertical blanking interval of frames from the source (e.g., display interface), the frames from the source gain N lines relative to each frame from the frame buffer each frame period. As with the example of FIG. 2, after signal SRD_ON goes inactive, frames from the source are stored into the frame buffer and read out from the frame buffer until the beginning of the vertical blanking regions of a source frame and a frame buffer frame are within a window of each other.

In the circled region, the beginning of the vertical blanking regions of the source frame and the frame buffer frame are within a window of each other. That event triggers signal SRD_STATUS to transition to inactive state. At the next rising edge of signal SOURCE_VDE, the display outputs the source frame as opposed to the frame from the frame buffer. In this example, no frames are skipped because all frames from the display interface that are stored in the frame buffer after signal SRD_ON goes inactive are read out to the display.

For example, the window can start at a time before the falling edge of TCON_VDE that achieves a minimum vertical blank specification of the display not being violated for the TCON frame and can become inactive after some delay from becoming active that achieves (1) a maximum vertical blank specification of the display not being violated for the TCON and (2) reading of the frame from the frame buffer has not started yet.

For the example of FIG. 3, a maximum lock time is $V_T/N$, where $V_T$ is the source frame size and N is the difference in number of lines or time between vertical blanking regions of a source buffer frame and frames from a frame buffer. A minimum lock time can be 0 frames if the first frame of SOURCE_VDE happens to align with TCON_VDE when SRD_ON becomes inactive.

In yet another embodiment, a lead or lag alignment mode of respective FIG. 2 or 3 can be used to determine when to output for display a frame from a graphics engine instead of from a frame buffer. In the table above, this scenario is labeled "Adaptive TCON sync." Immediately after SRD_ON goes to an inactive state to indicate to display the display interface data, vertical blanks of the source and display interface frames are inspected.

The timing controller or other logic determines a threshold value, P, that can be used to compare a SOURCE_VDE offset measured after signal SRD_ON goes to an inactive state. SOURCE_VDE offset can be measured between a first falling edge of a vertical blank of a frame buffer frame and a first falling edge of vertical blank of a source frame. Value P can be determined using the following equation:

$$P = N1 * V_T / (N1 + N2), \text{ where}$$

N1 and N2 are manufacturer specified values and $V_T$ represents a source frame time (length).

The timing controller is programmed with N1 and N2 values, where N1 represents a programmed limit by which a frame from the frame buffer lags a frame from the display engine and N2 represents a programmed limit by which a frame buffer frame leads a frame from a graphics engine.

A determination of whether to use lag or lead alignment techniques can be made using the following decision:

if initial SOURCE_VDE offset <=P, use lag technique (FIG. 2)

or if initial SOURCE_VDE offset >P, use lead technique (FIG. 3).

For most panels, N2<<N1, so the max lock time becomes larger than $V_T/2N$.

Figure 4:
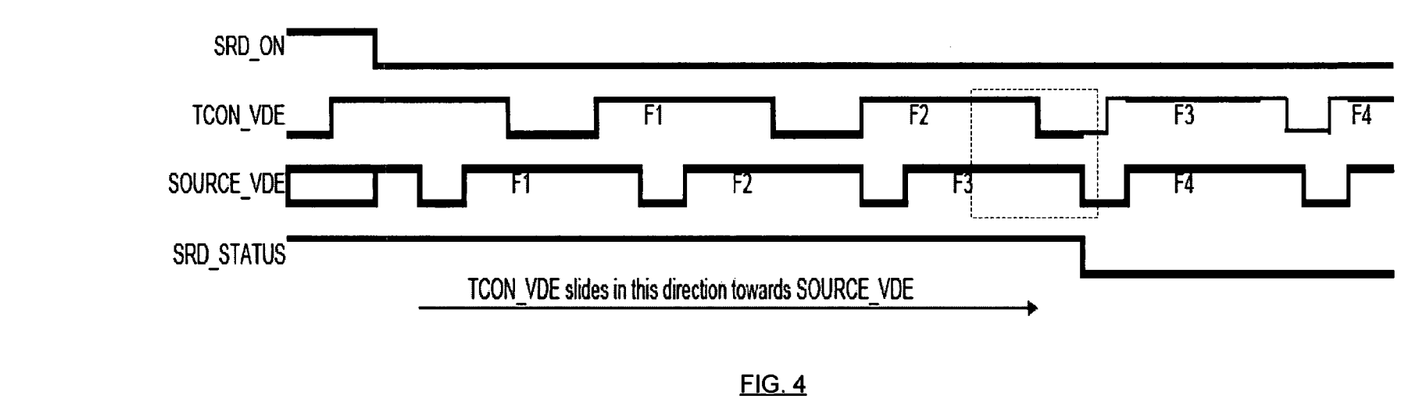
FIG. 4 depicts alignment of frames from a frame buffer with frames from a source.

FIG. 4 depicts alignment of frames from a frame buffer with frames from a source. In the table above, this scenario is labeled "Continuous Capture." In this embodiment, source frames are written into the frame buffer (SOURCE_VDE) and frames are also read out of the frame buffer (TCON_VDE) even after alignment has occurred. Before the alignment, the vertical blanking interval for the frames from the frame buffer is longer than the vertical blanking interval for the frames from the source. In an alternative embodiment, the vertical blanking region of the frames from the frame buffer can exceed that of the source frames by N lines.

When SRD_ON becomes inactive, frames from the display interface are written to the frame buffer but data for the display continues to be read from the frame buffer. In this way each frame from the display interface is first written to the frame buffer then read from the frame buffer and sent to the display. In the dotted square region, the beginning of the blanking regions of the source frame and the frame buffer frame are within a window of each other.

The beginning of the blanking region for the source frame (i.e., signal SOURCE_VDE going to the inactive state) triggers the SRD_STATUS to go inactive. Frames continue to be read from the frame buffer but the vertical blanking region after the very next active state of signal TCON_VDE is set to match the vertical blanking region of the source frame SOURCE_VDE.

For example, in the case where the TCON lags based on continuous capture, the window can start at some delay after the falling edge of TCON_VDE so that the minimum vertical blank specification of the display is not violated for the TCON frame, and the window can become inactive after some delay from becoming active that achieves the maximum vertical blank specification of the display not being violated for the TCON frame, while maintaining display quality. The window is also constructed so that some minimum phase difference is maintained between TCON_VDE and SOURCE_VDE.

The maximum time to achieve lock can be $V_T/N$, where $V_T$ is the source frame size and N is the difference in number of lines between vertical blanking regions of a source buffer frame and frame buffer frame. The minimum lock time can be 0 frame if the first SOURCE_VDE happens to align with TCON_VDE.

Figure 5:
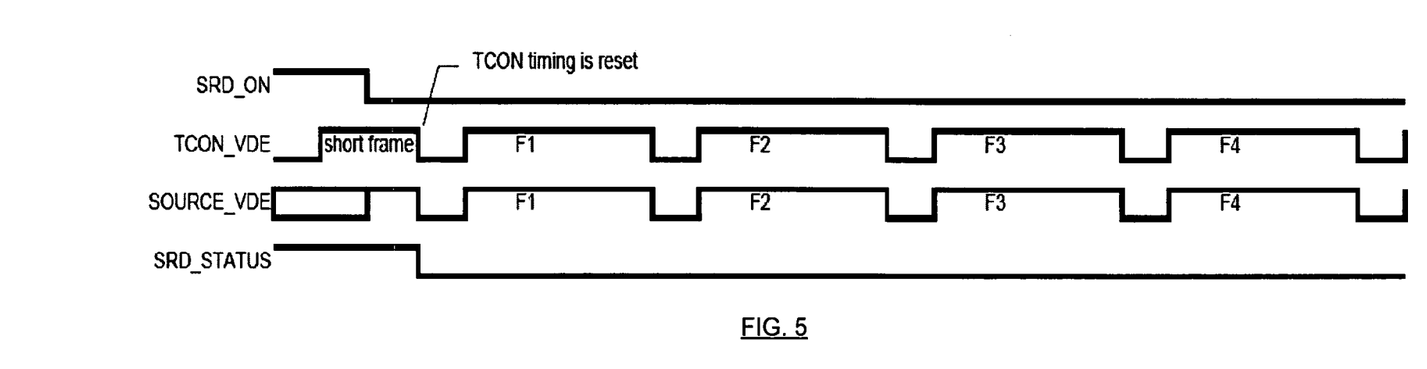
FIG. 5 depicts a scenario in which frames from the source are sent to the display immediately after a first falling edge of the source frame signal SOURCE_VDE after SRD_ON becomes inactive.

FIG. 5 depicts a scenario in which frames from the source are sent to the display immediately after a first falling edge of the source frame signal SOURCE_VDE after SRD_ON becomes inactive. In the table above, this scenario is labeled "TCON Reset." One possible scenario is a frame from the data buffer may not have been completely read out for display at a first falling edge of the source frame signal SOURCE_VDE. The frame read out during a first falling edge of the source frame signal SOURCE_VDE is depicted as "short frame." A short frame represents that an entire frame from the frame buffer was not read out for display. For example, if a first half of the pixels in a frame are displayed, the second half that is displayed is the second half from the frame buffer that was sent previously. The display of the second half may be decaying and so image degradation on the second half may be visible.

When the first source frame signal SOURCE_VDE transitions to inactive during a vertical blanking region of TCON_VDE, short frames may not occur.

In this scenario the maximum time to achieve lock can be zero. However, visual artifacts may result from short frames.

Figure 6A:
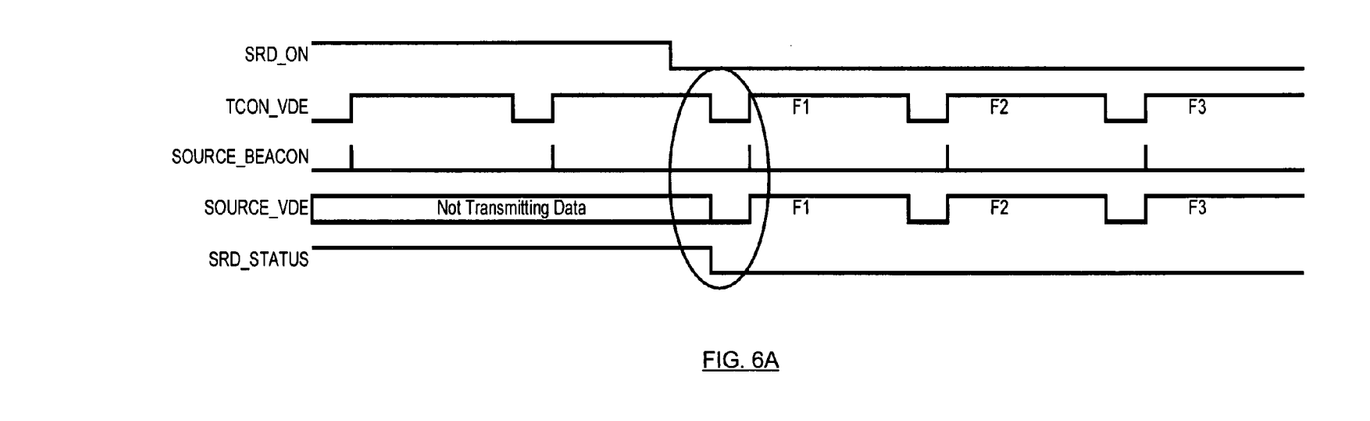
FIGS. 6A and 6B depict use of source beacon signals to achieve synchronization.
Figure 6B:
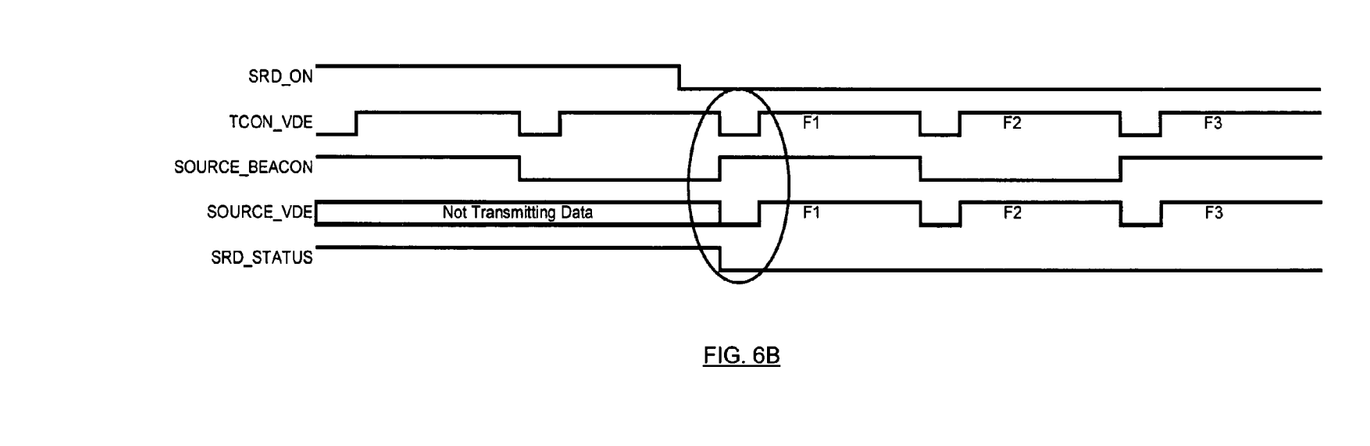

FIGS. 6A and 6B depict examples in which a source periodically provides a synchronization signal to maintain synchronization between frames from the frame buffer and frames from the source. In the table above, this scenario is labeled "Source Beacon." In FIG. 6A, signal SOURCE_BEACON indicates the end of a vertical blanking region whereas in FIG. 6B, a rising or falling edge of signal SOURCE_BEACON indicates the start of a vertical blanking region. Signal SOURCE_BEACON can take various forms and can indicate any timing point. Timing generator logic can use the SOURCE_BEACON signal to maintain synchronization of frames even when the display displays frames from a frame buffer instead of from a source. Accordingly, when the display changes from displaying frames from a frame buffer to displaying from a source, the frames are in synchronization and display of frames from the display interface can take place on the very next frame from the source.

Figure 7:
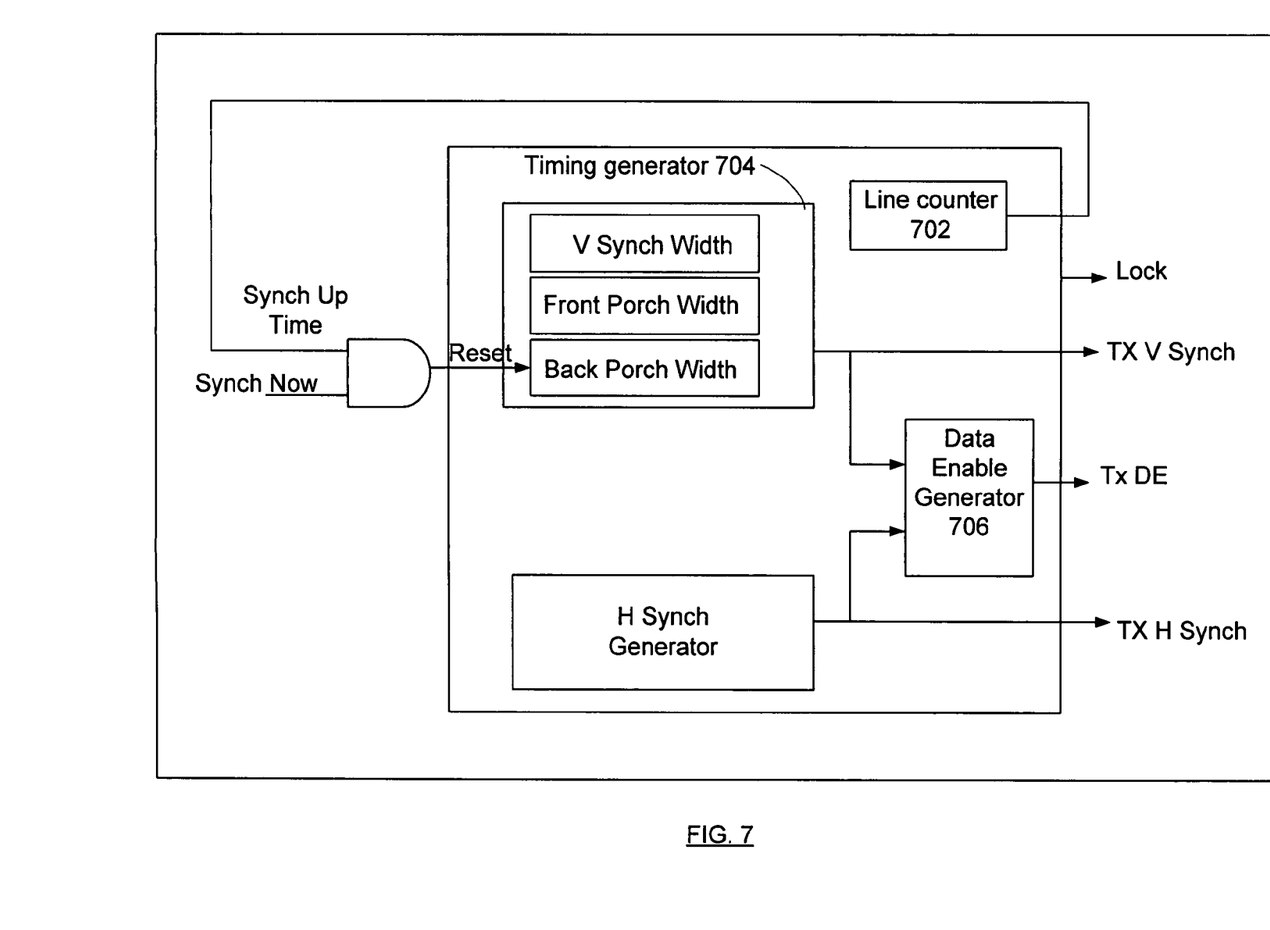
FIG. 7 depicts an example system that can be used to vary the vertical blanking interval in order to align frames from a frame buffer and frames from a graphics engine, display interface, or other source.

FIG. 7 depicts an example system that can be used to vary the vertical blanking interval in order to align frames from a frame buffer and frames from a graphics engine, display interface, or other source. The system of FIG. 7 can be implemented as part of the timing generator and timing synchronizer of FIG. 1. This system is used to control reading from the frame buffer and to transition from reading a frame from a frame buffer repeatedly to reading frames from a graphics engine, display interface, or other source written into the frame buffer.

The system of FIG. 7 can be used to determine whether the beginning of active states of a frame from a frame buffer and a frame from a source such as a display interface occur within a permissible time region of each other. If the active states of a frame from a frame buffer and a frame from a source occur within a permissible time region of each other, then the frames from the source can be output for display. In a lag scenario (TCON VBI is greater than source VBI), the system of FIG. 7 can be used to determine when to output a frame from a display interface. The system of FIG. 7 can be used whether streaming or continuous capture of frames from the display interface occurs.

In some embodiments, the refresh rate of a panel can be slowed and extra lines can be added during the vertical blanking interval of the frames read out of the frame buffer. For example, if a refresh rate is typically 60 Hz, the refresh rate can be slowed to 57 Hz or other rates. Accordingly, additional pixel lines worth of time can be added to the vertical blanking interval.

Line counter 702 counts the number of lines in a frame being read from the frame buffer and sent to the display. After a predefined number of lines are counted, line counter 702 changes signal Synch Up Time to the active state. Signal Synch Up Time can correspond to the timing window, mentioned earlier, within which synchronization can occur. Signal Synch Now is generated from signal SOURCE_VDE and indicates a time point within the source frame where synchronization can occur. When signal Synch Now enters the active state when signal Synch Up Time is already in the active state, line counter 702 resets its line count. Resetting the line counter reduces the vertical blanking interval of frames from a frame buffer and causes the frames from the frame buffer to be provided at approximately the same time as frames from a graphics engine (or other source). In particular, parameter Back Porch Width is varied to reduce the vertical blanking interval of frames based on where reset of the line counter occurs.

The V synch width, Front Porch Width, and Back Porch Width parameters are based on a particular line count or elapsed time.

Figure 8:
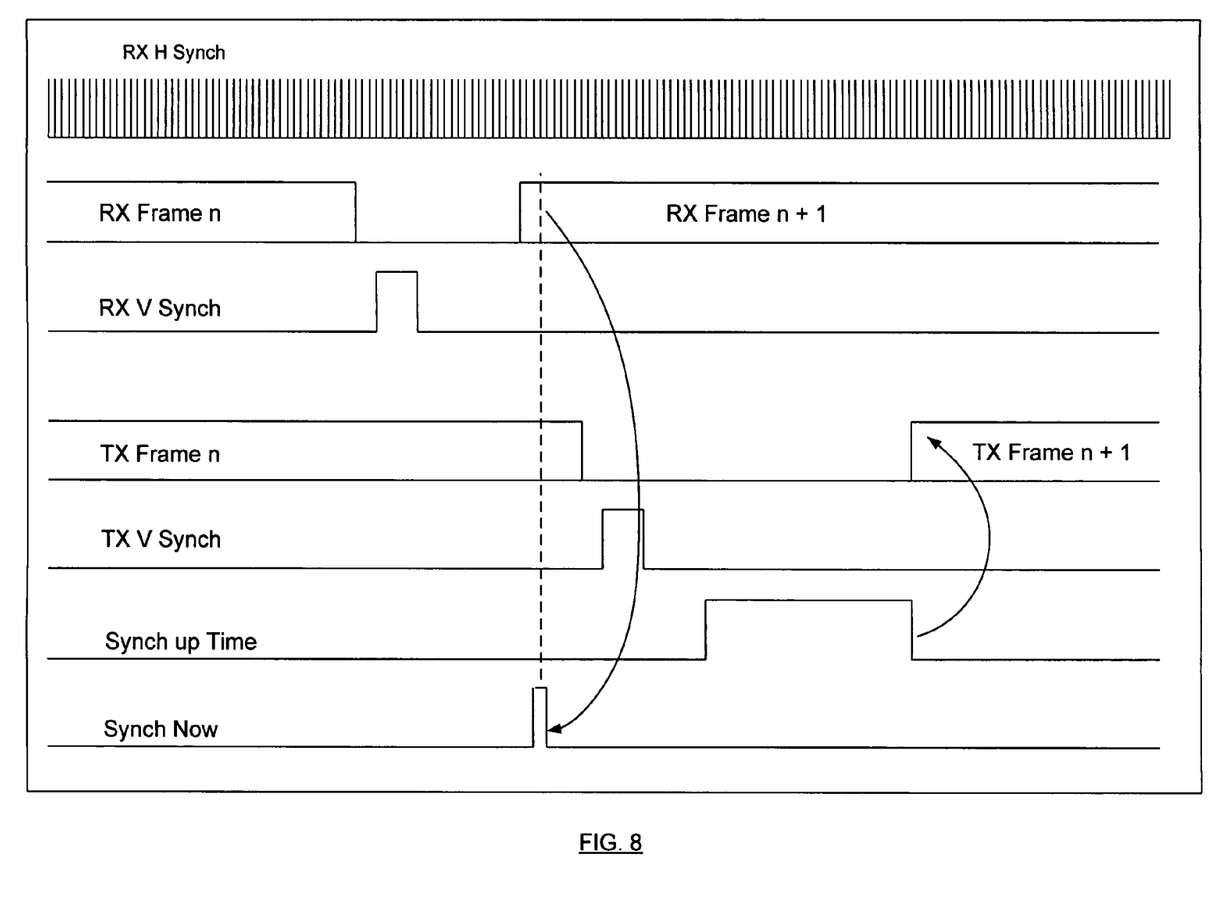
FIG. 8 depicts a scenario where frames from a frame buffer are not aligned with frames from a graphics engine.
Figure 9:
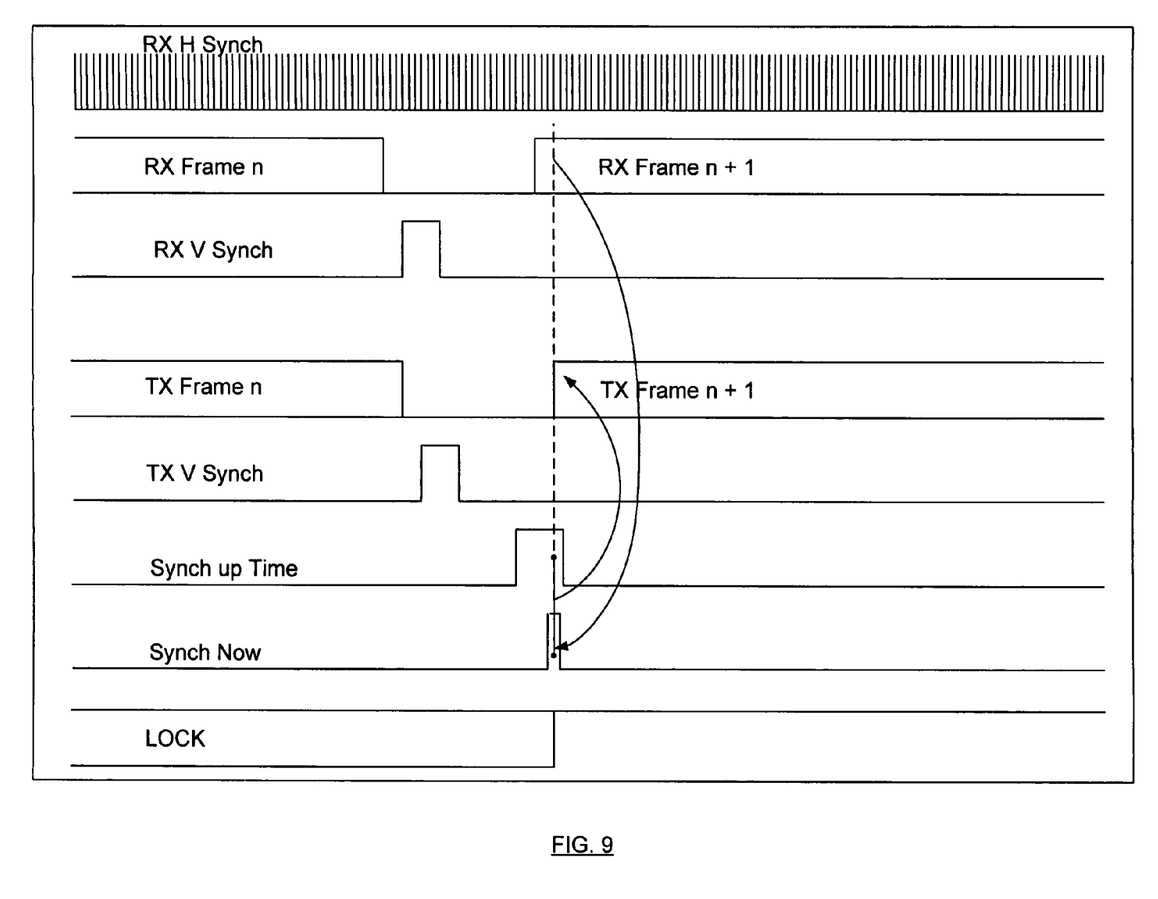
FIG. 9 depicts an example in which a transition of signal RX Frame n+1 to active state occurs within the Synch Up Time window of when signal TX Frame n+1 transitions to an active state.

Operation of the system of FIG. 7 is illustrated with regard to FIGS. 8 and 9. FIG. 8 depicts a scenario where the system has not synchronized the frames from a frame buffer with frames from a graphics engine or other source yet. FIG. 9 depicts a scenario where the system has synchronized the frames from a frame buffer with frames from a graphics engine or other source.

Referring first to FIG. 8, signal RX Frame n in the active state represents availability of data from a display interface to be written into the frame buffer. In response to signal RX Frame n transitioning to the inactive state, signal RX V Synch toggles to reset the write pointer to the first pixel in the frame buffer. When signal TX Frame n is in an active state, a frame is read from a frame buffer for display. In response to signal TX Frame n going inactive, signal TX V Synch toggles in order to reset the read pointer to the beginning of a frame buffer. A front porch window is a time between when completion of reading TX Frame n and the start of an active state of signal TX V Synch.

Timing generator 704 (FIG. 7) generates signal TX V Synch, TX DE and TX H Synch signals. The signal Reset is used to set the leading edge of DE timing to any desired start point. This is used to synchronize the TX timing to RX timings.

In this example implementation, the signal Synch Now transitions to the active state after writing of the first line of RX Frame n+1 into the frame buffer. In general, signal Synch Now can be used to indicate writing of lines other than the first line of an RX Frame. Signal Synch Up Time changes to active after line counter 702 counts an elapse of a combined active portion of a TX frame and minimum vertical back porch time for the TX frame. Signal Synch Up Time goes inactive when the vertical blanking interval of TX frame expires or the reset signal clears the line counter. Signal Synch Up Time going inactive causes reading of TX Frame n+1. However, signal Synch Now enters the active state when signal Synch up Time is not already in the active state. Accordingly, the vertical blanking time of signal TX Frame n+1 is not shortened to attempt to cause alignment with signal RX Frame n+1.

For example, for a 1280×800 pixel resolution screen, signal Synch Up Time transitions to active state when line counter 702 (FIG. 7) detects 821 horizontal lines have been counted. Counting of 821 lines represents elapse of a combined active portion of a frame and minimum backporch time for a TX frame.

Signal TX Data enable (signal TX DE in FIG. 7) generator 706 generates the data enable signal (TX DE) during the next pixel clock. This causes TX Frame n+1 to be read from the beginning of the frame buffer.

FIG. 9 depicts an example in which a transition of signal RX Frame n+1 to active state occurs within the Synch Up Time window just before the signal TX Frame n+1 transitions to an active state. Signal Synch Now is generated after the end of the writing of the first line (or other line) of RX Frame n+1 to the frame buffer. This causes the frame read pointer to lag behind the frame write pointer. When signal Synch Now enters the active state when signal Synch Up Time is already in the active state, signal Reset (FIG. 7) is placed into an active state. The signal Reset going to an active state causes timing generator 704 to truncate the vertical blanking interval by causing reading out of a received frame TX Frame n+1 from the frame buffer approximately one line behind the writing of frame RX Frame n+1 into the frame buffer. In other embodiments, more than one line difference can be implemented. This causes the frame read pointer to lag behind the frame write pointer. In addition, when signal Synch Now enters the active state when signal Synch Up Time is already in the active state, signal LOCK changes from the inactive to the active state, indicating that TX Frame is now locked to RX Frame. After synchronization, as with the continuous capture case, a vertical blanking interval time of frames from the frame buffer (TX frames) will be equal to the vertical blanking interval time of frames from the display interface (RX frames) due to the Reset signal happening every frame after the LOCK signal goes active.

The system of FIG. 7 can be used to synchronize frames from a frame buffer with frames from a source such as a display interface in a lead scenario where TCON VBI is smaller than source VBI. The VBI of frames from the TCON frame buffer can be increased to a maximum VBI for that frame when the synchronization point is within the window and the switch takes place before the rising edge of the next SOURCE_VDE. Alternatively, when the synchronization point is within the window, a switch takes place at the synchronization point.

Figure 10:
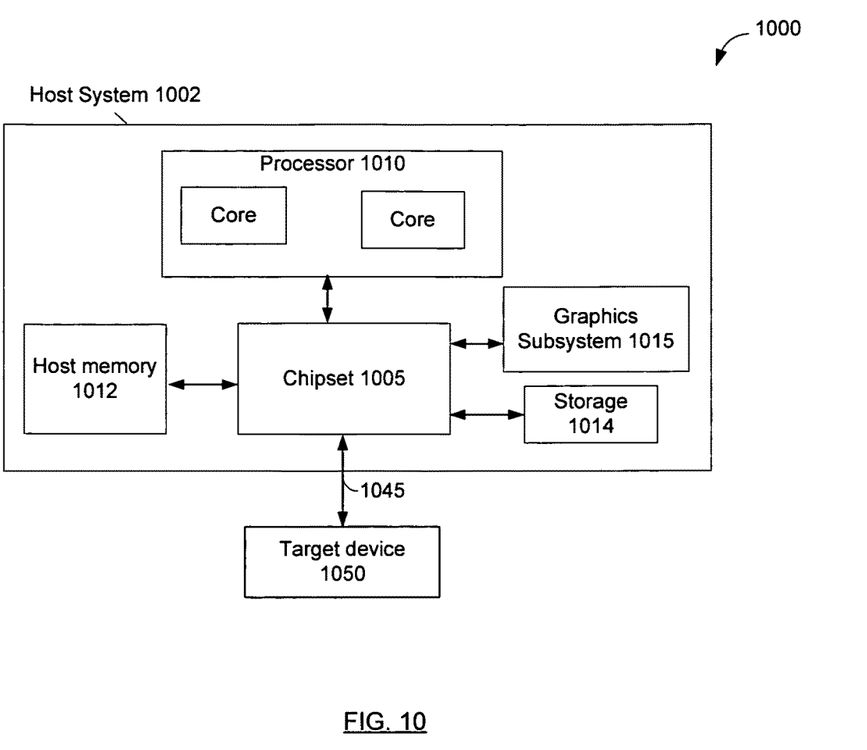
FIG. 10 depicts a system in accordance with an embodiment.

FIG. 10 depicts a system 1000 in accordance with an embodiment. System 1000 may include a source device such as a host system 1002 and a target device 1050. Host system 1002 may include a processor 1010 with multiple cores, host memory 1012, storage 1014, and graphics subsystem 1015. Chipset 1005 may communicatively couple devices in host system 1002. Graphics subsystem 1015 may process video and audio. Host system 1002 may also include one or more antennae and a wireless network interface coupled to the one or more antennae (not depicted) or a wired network interface (not depicted) for communication with other devices.

In some embodiments, processor 1010 can decide when to power down the frame buffer of target device 1050 at least in a manner described with respect to co-pending U.S. patent application Ser. No. 12/313,257, entitled "TECHNIQUES TO CONTROL OF SELF REFRESH DISPLAY FUNCTIONALITY," filed Nov. 18, 2008, inventors Kwa, Calyer, Ranganathan, and Biswal.

For example, host system 1002 may transmit commands to capture an image and power down components to target device 1050 using extension packets transmitted using interface 1045. Interface 1045 may include a Main Link and an AUX channel, both described in Video Electronics Standards Association (VESA) DisplayPort Standard, Version 1, Revision 1a (2008). In various embodiments, host system 1002 (e.g., graphics subsystem 1015) may form and transmit communications to target device 1050 at least in a manner described with respect to co-pending U.S. patent application Ser. No. 12/286,192, entitled "PROTOCOL EXTENSIONS IN A DISPLAY PORT COMPATIBLE INTERFACE," filed Sep. 29, 2008, inventors Kwa, Vasquez, and Kardach.

Target device 1050 may be a display device with capabilities to display visual content and broadcast audio content. Target device 1050 may include the system of FIG. 1 to display frames from a frame buffer or other source. For example, target device 1050 may include control logic such as a timing controller (TCON) that controls writing of pixels as well as a register that directs operation of target device 1050.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device such as a handheld computer or mobile telephone with a display.

Embodiments of the present invention may be implemented as any or a combination of: one or more microchips or integrated circuits interconnected using a motherboard, hard-wired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A computer-implemented method comprising:
receiving, by said computer, at least one frame from a first frame source, wherein an interval between two frames from the first frame source comprises a first vertical blanking interval;
reading at least one frame from a second frame source, wherein an interval between two frames from the second frame source comprises a second vertical blanking interval;
providing a frame from the second frame source for display;
determining whether commencements of the first vertical blanking interval and the second vertical blanking interval occur with a predefined time region, wherein the predefined time region is set to achieve a minimum vertical blank specification of the display not being violated for a frame from the second frame source and at least (1) a maximum vertical blank specification of the display not being violated for a frame from the second frame source and (2) read of a frame from the second frame source has not commenced; and
selectively providing a next frame from the first frame source for display after the determination that the commencements of the first vertical blanking interval and the second vertical blanking interval occurred with the predefined time region.

2. The method of claim 1, wherein the first frame source comprises a display interface and the second frame source comprises a frame buffer in a monitor.

3. The method of claim 1, wherein the first frame source comprises a frame buffer in a monitor and the second frame source comprises a display interface.

4. A computer-implemented method comprising:
receiving, by said computer, at least one frame from a first frame source, wherein an interval between two frames from the first frame source comprises a first vertical blanking interval;
storing the at least one frame from the first frame source into a second frame source;
providing at least one frame from the second frame source for display, wherein an interval between two frames from the second frame source comprises a second vertical blanking interval;
determining whether commencements of the first vertical blanking interval and the second vertical blanking interval occur within a predefined time region, wherein in a case where the second vertical blanking interval exceeds the first vertical blanking interval, the predefined time region is to start at a time after indication of unavailability of data from the second frame source and is to achieve a minimum vertical blank specification of the display not being violated for a frame from the second frame source and the predefined time region is set to end so that a maximum vertical blank specification of the display is not violated for a frame from the second frame source;
setting the second vertical blanking interval to approximately equal the first vertical blanking interval in response to the determination that the commencements of the first vertical blanking interval and the second vertical blanking interval occurred within the predefined time region; and
providing the at least one frame from the second frame source for display.

5. The method of claim 4, wherein the first frame source comprises a display interface and the second frame source comprises a frame buffer in a display device.

6. The method of claim 4, wherein setting the second vertical blanking interval to approximately equal the first vertical blanking interval comprises shortening the second vertical blanking interval.

7. A computer-implemented method comprising:
receiving, by said computer, at least one frame from a first frame source, wherein an interval between two frames from the first frame source comprises a first vertical blanking interval;
storing the at least one frame from the first frame source into a second frame source;
providing at least one frame from the second frame source for display, wherein an interval between two frames from the second frame source comprises a second vertical blanking interval;
receiving a synchronization signal in an active state, the synchronization signal changes to an active state when both of the following are in an elapsed state at the same time: an active portion of a frame from the second frame source and minimum vertical back porch time for the frame from the second frame source;
in response to storing of one of first several lines but less than an entirety of one of the at least one frame from the first frame source into the second frame source and the synchronization signal being in the active state, setting the second vertical blanking interval to approximately equal the first vertical blanking interval; and
providing the at least one frame from the second frame source for display.

8. The method of claim 7, wherein the first frame source comprises a display interface and the second frame source comprises a frame buffer in a display device.

9. The method of claim 7, wherein setting the second vertical blanking interval to approximately equal the first vertical blanking interval comprises shortening the second vertical blanking interval.

10. A system comprising:
a host computer comprising a network interface and
a display device comprising a memory device and a display interface, the display device comprising:
logic to display frames from the memory device or the display interface, wherein an interval between two frames from the memory device comprises a first vertical blanking interval and wherein an interval between two frames from the display interface comprises a second vertical blanking interval,
logic to change from display of frames from the memory device to display of frames from the display interface, wherein to change from display of frames from the memory device to display of frames from the display interface, the logic is to:
determine whether commencements of the first vertical blanking interval and the second vertical blanking interval occurred within a predefined time region, wherein the predefined time region is set to achieve a minimum vertical blank specification of the display not being violated for a frame from the memory device and at least (1) a maximum vertical blank specification of the display not being violated for a frame from the memory device and (2) read of a frame from the memory device has not commenced and selectively provide a next frame from the display interface to the display after the determination that the commencements of the first vertical blanking interval and the second vertical blanking interval occurred within the predefined time region.

11. The system of claim 10, wherein to change from display of frames from the memory device to display of frames from the display interface, the logic is to:
store at least one frame from the display interface into the memory device and
set the first vertical blanking interval to approximately equal the second vertical blanking interval in response to a determination that the commencements of the first vertical blanking interval and the second vertical blanking interval occurred with the predefined time region, wherein to selectively provide a next frame from the display interface to the display, the logic is to:
store at least one frame from the display interface into the memory device and
provide the stored at least one frame from the memory device for display.

12. The system of claim 10, wherein to set the first vertical blanking interval to approximately equal the second vertical blanking interval, the logic is to shorten the first vertical blanking interval.

13. The system of claim 10, wherein the display interface is compatible at least with a DisplayPort specification.

14. The system of claim 10, wherein the network interface comprises a wireless network interface.

15. A system comprising:
a memory device,
a display interface, and
a display device comprising:
logic to receive at least one frame from the display interface, wherein an interval between two frames from the display interface comprises a first vertical blanking interval;
logic to store the at least one frame from the display interface into a frame buffer;
logic to provide at least one frame from the frame buffer, wherein an interval between two frames from the frame buffer comprises a second vertical blanking interval;
logic to receive a synchronization signal in an active state, the synchronization signal is to change to an active state when both of the following are in an elapsed state at the same time: an active portion of a frame from the frame buffer and minimum vertical back porch time for the frame from the frame buffer;
logic to set the second vertical blanking interval to approximately equal the first vertical blanking interval in response to storage of one of first several lines but less than an entirety of one of the at least one frame from the display interface into the frame buffer and the synchronization signal being in an active state; and
logic to provide the at least one frame from the frame buffer for display with second vertical blanking interval approximately equal to the first vertical blanking interval.

16. The system of claim 15, wherein logic to set the second vertical blanking interval to approximately equal the first vertical blanking interval is to shorten the second vertical blanking interval.

17. The system of claim 15, further comprising logic to generate a synchronization signal in an active state, the logic to generate a synchronization signal in an active state comprises a line counter.

18. An apparatus comprising:
logic to cause display of frames from a memory device or a display interface, wherein an interval between two frames from the memory device comprises a first vertical blanking interval and wherein an interval between two frames from the display interface comprises a second vertical blanking interval,
logic to change from display of frames from the memory device to display of frames from the display interface, wherein to change from display of frames from the memory device to display of frames from the display interface, the logic is to:
determine whether commencements of the first vertical blanking interval and the second vertical blanking interval occurred within a predefined time region, wherein the predefined time region is set to achieve a minimum vertical blank specification of the display not being violated for a frame from the memory device and to achieve at least (1) a maximum vertical blank specification of the display not being violated for a frame from the memory device and (2) read of a frame from the memory device has not commenced and
selectively provide a next frame from the display interface to the display after the determination that the commencements of the first vertical blanking interval and the second vertical blanking interval occurred within the predefined time region.

19. The apparatus of claim 18, wherein to change from display of frames from the memory device to display of frames from the display interface, the logic is to:
store at least one frame from the display interface into the memory device and
set the first vertical blanking interval to approximately equal the second vertical blanking interval in response to a determination that the commencements of the first vertical blanking interval and the second vertical blanking interval occurred with the predefined time region, wherein to selectively provide a next frame from the display interface to the display, the logic is to:
store at least one frame from the display interface into the memory device and
provide the stored at least one flame from the memory device for display.

20. An apparatus comprising:
logic to receive at least one frame from a display interface, wherein an interval between two frames from the display interface comprises a first vertical blanking interval;
logic to store the at least one frame from the display interface into a frame buffer;
logic to provide at least one frame from the frame buffer, wherein an interval between two frames from the frame buffer comprises a second vertical blanking interval;
logic to receive a synchronization signal in an active state, the synchronization signal is to change to an active state when both of the following are in an elapsed state at the same time: an active portion of a frame from the frame buffer and minimum vertical back porch time for the frame from the frame buffer;
logic to set the second vertical blanking interval to approximately equal the first vertical blanking interval in response to storage of one of first several lines but less than an entirety of one of the at least one frame from the display interface into the frame buffer and the synchronization signal being in an active state; and logic to provide the at least one frame from the frame buffer for display with second vertical blanking interval approximately equal to the first vertical blanking interval.

21. The apparatus of claim 20, wherein logic to set the second vertical blanking interval to approximately equal the first vertical blanking interval is to shorten the second vertical blanking interval.

22. An apparatus comprising:

logic to store at least one frame from a display interface into a frame buffer, wherein an interval between two frames from the display interface comprises a first vertical blanking interval;

logic to provide at least one frame from the frame buffer for display, wherein an interval between two frames from the frame buffer comprises a second vertical blanking interval;

logic to determine whether commencements of the first vertical blanking interval and the second vertical blanking interval occur within a predefined time region, wherein in a case where the second vertical blanking interval exceeds the first vertical blanking interval, the predefined time region is to start at a time after indication of unavailability of data from the frame buffer and is to achieve a minimum vertical blank specification of the display not being violated for a frame from the frame buffer and the predefined time region is set to end so that a maximum vertical blank specification of the display is not violated for a frame from the frame buffer;

logic to set the second vertical blanking interval to approximately equal the first vertical blanking interval in response to the determination that the commencements of the first vertical blanking interval and the second vertical blanking interval occurred within the predefined time region; and logic to provide the at least one frame from the frame buffer for display.

23. The apparatus of claim 22, further comprising a display, a display interface, and at least one memory device.

* * * * *